April 27, 1937.　　　　E. B. HUDSON　　　　2,078,713
SEGMENT RAILWAY BEARING
Filed Jan. 18, 1935　　　　3 Sheets-Sheet 1

INVENTOR,
Edwin B. Hudson
BY Allen & Allen
ATTORNEYS.

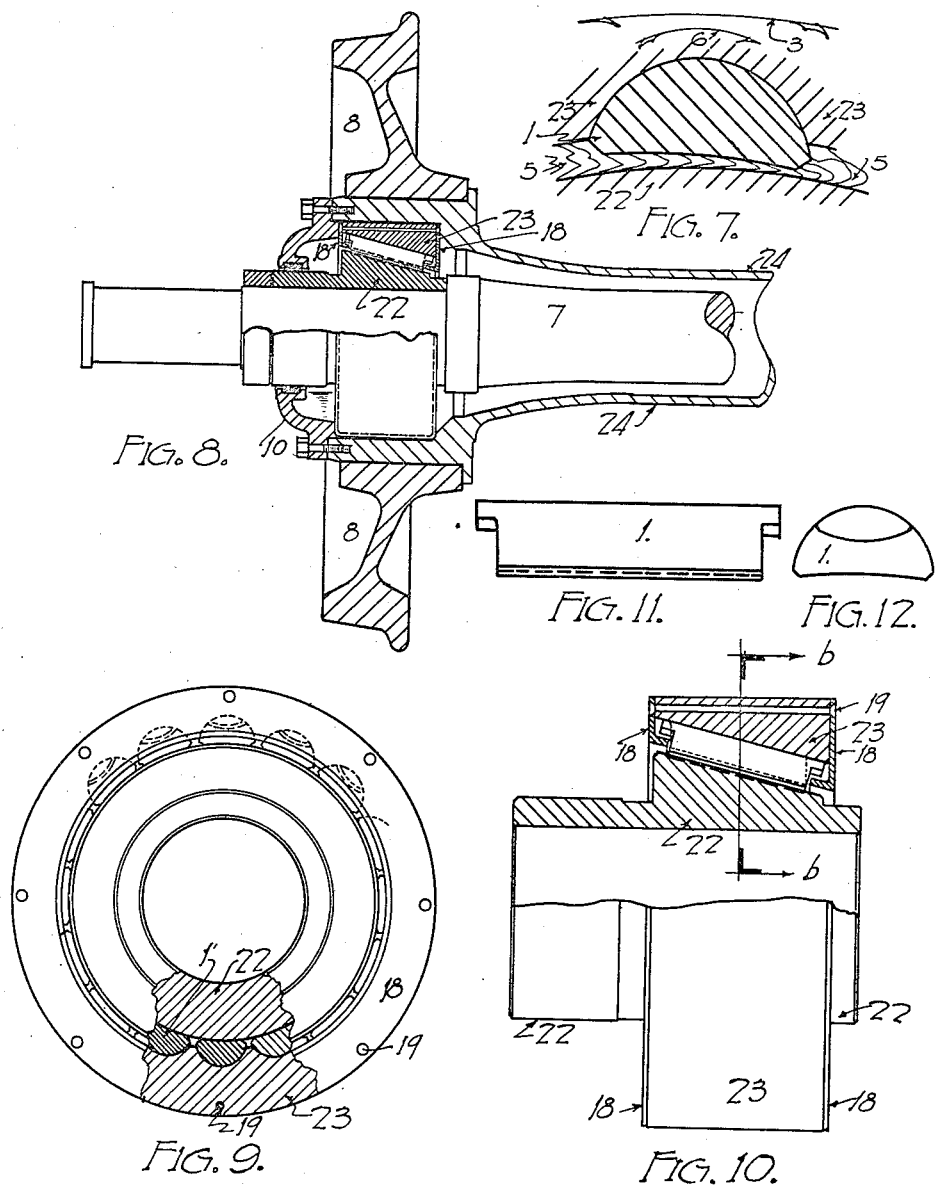

April 27, 1937.  E. B. HUDSON  2,078,713

SEGMENT RAILWAY BEARING

Filed Jan. 18, 1935  3 Sheets-Sheet 3

INVENTOR
Edwin B. Hudson
BY Allen & Allen
ATTORNEYS

Patented Apr. 27, 1937

2,078,713

UNITED STATES PATENT OFFICE 2,078,713

SEGMENT RAILWAY BEARING

Edwin B. Hudson, Middletown, Ohio, assignor to The American Rolling Mill Company, Middletown, Ohio, a corporation of Ohio Application January 18, 1935, Serial No. 2,404

9 Claims. (Cl. 308—73)

My invention relates to the provision of a new type of bearing for railway rolling stock. Bearings of the general type which I propose to use are shown, described and claimed in my co-pending applications Serial No. 746,539, filed October 2, 1934, and Serial No. 2,403, filed of even date herewith.

It is an object of my invention to provide a bearing for railway rolling equipment which has high load capacity and is capable of withstanding high impact loads, and which at the same time has a low coefficient of friction, whereby the power requirements are materially reduced.

Another object of my invention is to provide a bearing on which the inspection is reduced to an absolute minimum, and which requires only that a sufficient amount of oil be provided.

It is another object of my invention to provide a bearing in which the loads are carried by surface contact between the moving parts, and in which the said surfaces are separated by an oil film.

Further, it is an object of my invention to provide a bearing according to the above objects, in which the oil film is automatically built up and maintained.

Finally, it is an object of my invention to eliminate line or spot contact between the moving parts such as occurs in roller or ball bearings, where hardening of the surfaces occurs when high impact loads are imposed, as, for instance, when a wheel runs over frogs or crossings at high speed.

Hitherto, in bearings for railway equipment and the like, there has been provided a journal box into which the end of the shaft projects. An upper solid journal block is the thing which bears the load of the loaded vehicle and transmits the pressure thereof to the shaft. For satisfactory operation of such bearings, continuous lubrication must be applied, in spite of which the friction is high and wear is fairly rapid. Moreover, such bearings have necessitated the use of special types of dust guards and the like, inasmuch as compensation must be allowed for wear, and the problem of maintenance of satisfactory lubrication has been a serious one.

Further objects of my invention, therefore, are the provision of a new type of bearing structure which not only is characterized by radically diminished friction, but also by less severe lubrication problems so long as an adequate supply of lubricant is maintained, and which do not wear to the extent of displacing the shaft substantial distances. Consequently, it is possible, and it is one of the objects of my invention to produce a structure in which dust guards of the ordinary type may be eliminated and replaced by sealing structures which are very much more permanent as well as very much more efficient.

These and other objects of my invention which will be set forth hereinafter or will be apparent to one skilled in the art upon reading these specifications, I accomplish by that certain construction and arrangement of parts of which I shall now describe three exemplary embodiments. Reference is now made to the drawings which form a part hereof, and in which—

Figure 7 illustrates the segment bearing principle of lubrication with the inside race stationary.

Figure 8 shows the application of a segment bearing to a non-rotating axle assembly.

Figure 9 shows an end view of the segment bearing partly cut away to illustrate the parts.

Figure 10 shows an edge view of the segment bearing partly cut away to illustrate the position of the segments to carry both the radial and thrust loads.

Figure 11 shows a side view of a segment.

Figure 12 shows an end view of a segment.

Figures 1, 2, 5, 6:
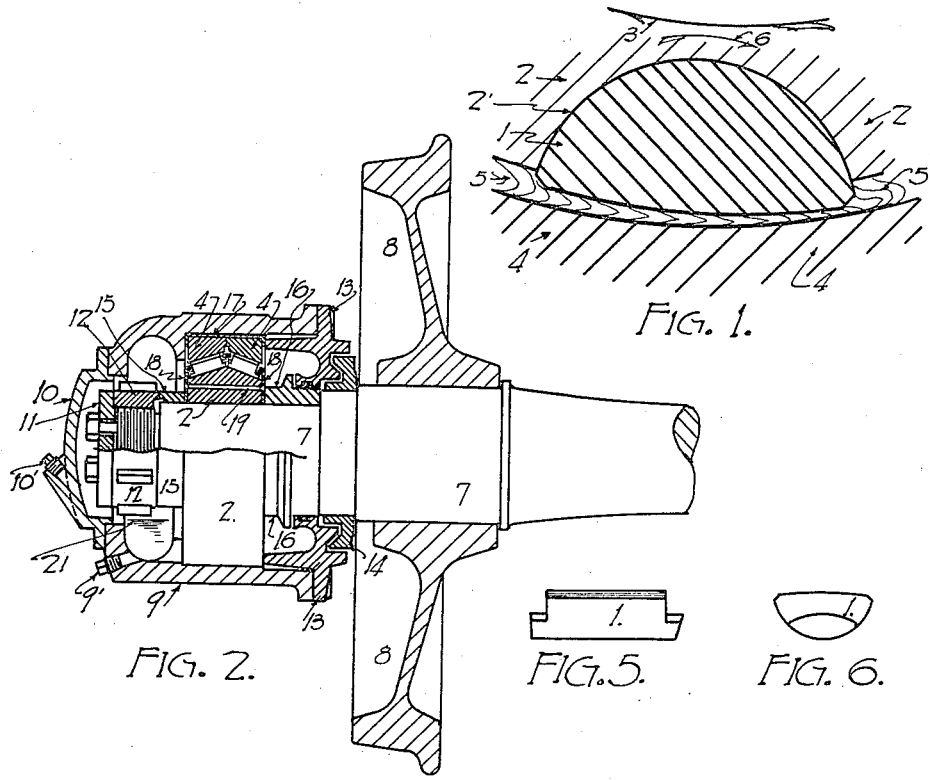
Figure 1 illustrates the segment bearing principle of lubrication with the outside race stationary.
Figure 2 shows the application to a conventional roller bearing journal box.
Figure 5 shows a side view of a segment.
Figure 6 shows an end view of a segment.
Figures 3, 4:
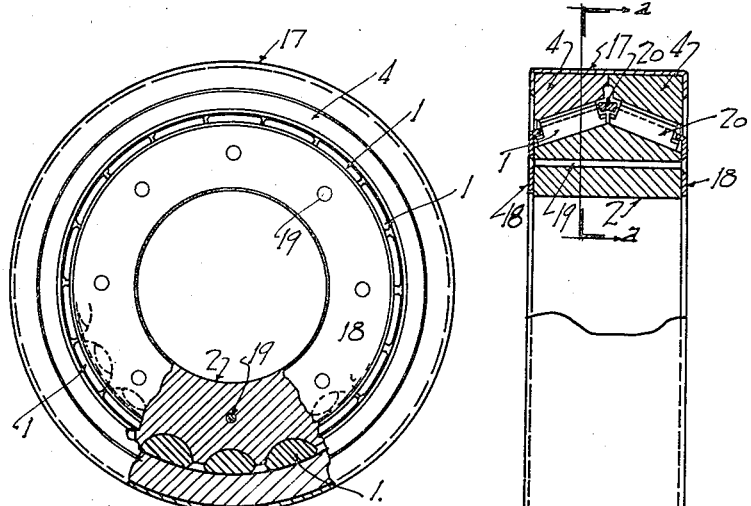
Figure 3 shows an end view of the segment bearing partly cut away to illustrate the parts.
Figure 4 shows an edge view of the segment bearing partly cut away to show the position of the segments to carry both radial and thrust loads.

In the drawings I have shown three exemplary embodiments as follows: (a) the application of a segment bearing to the conventional outside journal box of the type generally used for roller bearings, which is illustrated in Figures 1 to 6 inclusive; (b) the application of the segment bearing to a location within the wheel separator housing using a non-rotating axle, which is illustrated in Figures 7 to 12 inclusive; and (c) the application of a segment bearing to such installations as pony wheels and drive wheels on locomotives, in which the outside race is split into two parts whereby the segments may be removed for inspection or replacement without necessitating the pulling of the wheel.

Summarizing briefly, with reference to Figure 1, the principles of the segment bearing which are described in detail in my co-pending application first above mentioned, the segments are carried in flute-shaped grooves 2' in the inside race 2 which rotates in the direction indicated by the arrow 3. The outside race is indicated at 4 and the separating oil film at 5. As the inside race rotates in the indicated direction, masses of oil building up at the leading bevel edges of the segments 1 cause the latter to tilt in the direction indicated by the arrow 6, forming wedge-like oil films 5 under pressure between the segments 1 and the outside race 4, thus insuring complete separation of adjoining surfaces, and reduction of friction, but adequate transmission of pressure.

In Figure 2 I have shown a general arrangement comprising an axle 7, a wheel 8, a journal box 9 having an oil drain at 9', and a cover plate 10 with an oil filler hole at 10'. The locking devices 11 and 12 are attached to the axle 7 as shown, and an inside cover plate is shown at 13, a dust closure ring at 14, and the separators at 15 and 16. These parts are the same as in the conventional journal, and are therefore not described in detail.

In this type of bearing two outside races 4 are used so as to take two-directional thrusts, and are held in a pressed-on container 17. The segments 1 rest in the inclined grooves in the inside race 2, their outside ends being held loosely in position by the rings 18 which are fastened together by the rivets 19, their inner ends being loosely held in position by means of the ring 20. The level of the oil in the housing is indicated at 21.

In the embodiment illustrated in Figures 8 to 12 inclusive, the fundamental principles of which are described in detail in my co-pending application second above mentioned, the axle 7 is non-rotating, the inner race 22 is stationary, and the outer race 23 rotates and carries the segments 1. Here the outer race 23 is pressed into the separator housing 24, and the wheel 8 is pressed on the outside of the separator housing 24 as shown. In these figures, of course, members which are the same as those in Figures 1 to 6 inclusive, have been given like reference numerals for the sake of clarity and simplicity.

Figure 13:
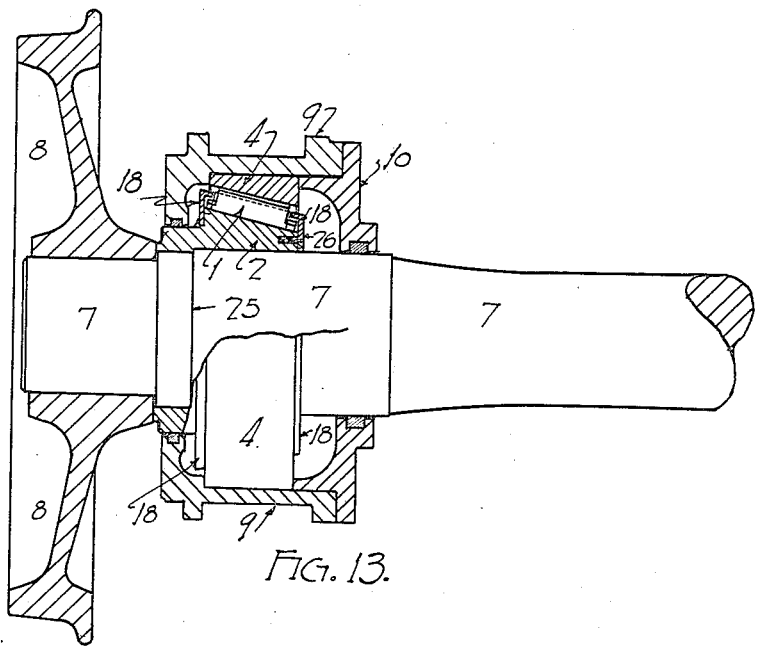
Figure 13 shows the application of the segment bearing located inside the wheels, such as pony or drive wheels on locomotives, whereby the replaceable parts can be removed without pulling the wheel.
Figure 14:
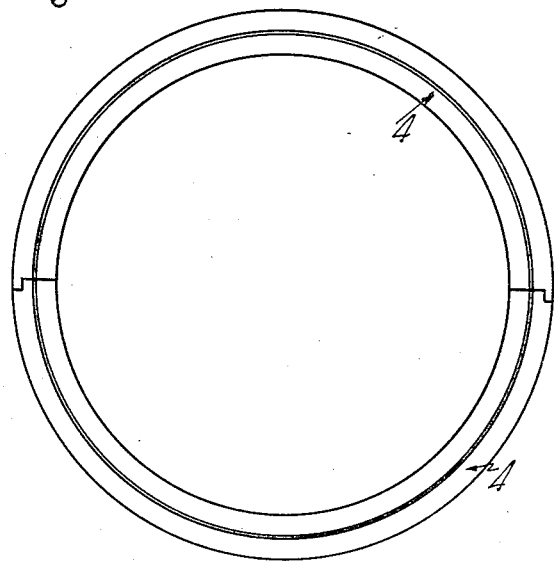
Figure 14 shows an end view of the outside split race.
Figure 15:
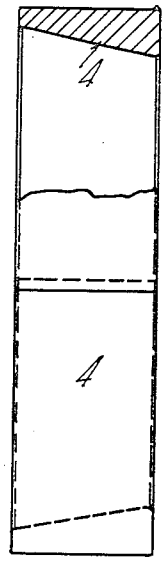
Figure 15 shows an edge view of the outside race.

In the embodiment illustrated in Figures 13 to 15 inclusive, the inner race 2 is pressed on the axle 7 against the shoulder 25, and the wheel 8 is then pressed into position as shown. The segments 1 are held in position by the rings 18, the inside one of which is held in place by the screws 26. Since the outer race 4 is made in two parts, as shown in Figure 14, the only parts subject to replacement on account of wear, i. e. the outer race and the segments 1, may be inspected and replaced simply by removing the screws 26, and it is not necessary to remove the wheel 8.

It will be clear that I have in these constructions provided a type of anti-friction bearing which is adequate to sustain the loads imposed upon it, because it is not characterized by spot or line contact between opposed bearing surfaces. It will be noted that the segments 1 are in grooves in the raceways, which are semi-circular in cross section so that they have a broad area of contact therewith, and that the faces of these segments projecting beyond the raceways are broad and are curved in substantial conformation with the surface of the opposed bearing member. These broad cooperating surfaces are adequate for the transmission of heavy pressure without deflection and without the working of the surfaces so as to harden them, and friction is reduced very greatly by the operation of these segments in tilting so as to form a space for the building up of a wedge-shape film of oil between the outer surfaces of the segments and the cooperating bearing surface. The raceways, which contain the segmental bearing members, are, as shown, preferably placed upon the rotating parts of the assembly so as to rotate therewith. This results in alternately bringing the segments into and out of load-bearing position, relieves wear and strain, and also permits renewal of the oil film. So long as there is an adequate supply of lubrication present, the bearing will operate without developing heat due to friction, and will require substantially no attention.

It will be noted in the several figures how the slanting of the raceways is employed to center the axles with respect to the stationary parts of the structure such either as the journal housing or the stationary shaft, where one is used. Each individual bearing may be made self-centering, as illustrated, for example, in Figures 2 and 4, or in other styles the bearings located toward each end of the shaft may cooperate to produce centering.

It is to be understood that different forms of my preferred embodiments may be made without departing from the spirit of my invention.

Having thus described my invention, what I claim as new and desire to secure by Letters Patent, is:—

1. In a bearing for railway rolling stock a rotatable element and a non-rotatable element, a smooth bearing surface upon said non-rotatable element, a plurality of axially disposed grooves of semi-cylindrical cross section upon said rotatable element, and a plurality of bearing segments of semi-cylindrical shape mounted with their cylindrical surfaces in said grooves, and their other faces in bearing contact with said bearing surfaces upon said non-rotatable member.

2. In a bearing for railway rolling stock capable of withstanding two-directional loads, a rotatable member and a non-rotatable member, said non-rotatable member having a pair of opposed conical bearing surfaces, said rotatable member having a plurality of axially disposed grooves of semi-cylindrical cross section, said grooves being arranged in two groups, one group being substantially parallel to each of said conical bearing surfaces, and a plurality of bearing segments of semi-cylindrical shape mounted with their cylindrical surfaces in said grooves, and their other faces being in bearing contact with said conical bearing surfaces upon said non-rotatable member.

3. In a bearing for railway rolling stock, a rotatable shaft, a ring member pressed onto said shaft, having at least one peripheral group of semi-cylindrical grooves disposed in planes through the axis of said shaft and at an angle thereto, a plurality of bearing segments of semi-cylindrical shape mounted with their cylindrical surfaces within said grooves, and a non-rotatable sleeve having at least one conical bearing surface on its interior, the angularity of said surface being such that it is substantially parallel to and in frictional contact with the outer surfaces of said segments.

4. In a bearing for railway rolling stock, a non-rotatable shaft, a ring member pressed onto said shaft having at least one conical bearing surface, a wheel having at least one segment bearing member pressed into it centrally, said last mentioned member having a plurality of semi-cylindrical grooves disposed with their axes in planes parallel to the axis of said wheel, and at an angle thereto corresponding to the angularity of said conical bearing surface, and a plurality of bearing segments of semi-cylindrical shape mounted with their cylindrical surfaces within said grooves and their other surfaces in bearing contact with said conical bearing surface.

5. In a bearing member for railway rolling stock, a rotatable shaft, a ring member pressed onto said shaft having at least one peripheral group of semi-cylindrical grooves disposed in planes through the axis of said shaft and at an angle thereto, a plurality of bearing segments of semi-cylindrical shape mounted with their cylindrical surfaces within said grooves, and a non-rotatable sleeve member having an interior conical bearing surface of an angularity to correspond to the angularity of said segments, and constructed in two halves adapted to overlie and bear upon the outer surfaces of said segments, and means to removably hold the elements of said sleeve member in operative relation to the said segments, whereby said sleeve member or said segments may be inspected or replaced without the necessity of pulling a wheel.

6. In a loaded bearing construction for railway rolling stock, the combination of members having opposed bearing surfaces, one of which members is rotatable, said member having a plurality of longitudinal grooves therein of semi-circular cross section, segment members of substantially semi-cylindrical shape in said grooves having contacting surfaces similarly shaped, and surfaces projecting therebeyond which are shaped to conform to the surface of the other of said members, and means for feeding lubricant to said bearing, said segmental members, at least at the leading edge with respect to the rotation of said grooved member, being beveled, and said segmental members being tiltable with respect to said member whereby a film of oil may be built up under pressure between said segments and said cooperating bearing surface.

7. In a pressure transmitting bearing for railway rolling stock, the combination of inner and outer raceways, one of said raceways being grooved with grooves semi-circular in cross section, and substantially semi-cylindrical bearing members being mounted in said grooves, said bearing members being tilted out of parallel with the axis of said bearing members.

8. In a pressure transmitting bearing for railway rolling stock, the combination of inner and outer raceways, one of said raceways being grooved with grooves semi-circular in cross section, and substantially semi-cylindrical bearing members being mounted in said grooves, said bearing members being tilted out of parallel with the axis of said bearing members, there being in said bearing structure another set of bearing members tilted in a direction opposed to the tilting of said first mentioned bearing members.

9. In a pressure transmitting bearing for railway rolling stock, the combination of inner and outer raceways, one of said raceways being grooved with grooves semi-circular in cross section, and substantially semi-cylindrical bearing members being mounted in said grooves, said bearing members being tilted out of parallel with the axis of said bearing, and a second similar construction in which said bearing members are oppositely tilted for centering purposes.

EDWIN B. HUDSON.